Patented June 2, 1931

1,808,081

UNITED STATES PATENT OFFICE

FRANCIS D. SULLIVAN, OF MEMPHIS, TENNESSEE

ACID-PROOF COATING COMPOSITION

No Drawing.    Application filed May 23, 1929.    Serial No. 365,570.

This invention relates to acid-proof coating composition and an object of the invention is to provide a coating composition that is highly resistant to deterioration under contact with acid or acid fumes and protects the coated surface from destruction caused by acids, and at the same time provides a coated surface that is water and weather proof.

Further objects of the invention are to provide a coating composition that requires the minimum of equipment in its manufacture, is comparatively simple and inexpensive to manufacture and is highly efficient and reliable in its intended use.

With the foregoing and other objects in view, the invention consists of a novel combination of elements as will be hereinafter more specifically described and illustrated, but it is to be understood that changes, variations and modifications may be resorted to without departing from the spirit of the claims hereunto appended.

The invention in its broadest aspect consists of the use of sulphur in various specific mixtures with other ingredients, to be specifically enumerated presently, the latter having been found by experiment to produce a mixture suitable for many purposes, in weather, water and acid proofing surfaces without detracting from the appearance of the surface that is coated.

The following description enumerates as a cement, a mixture having a smaller content of sulphur and is designated as a cement because its viscosity requires that it be flowed upon the surface to be coated.

Where the composition is designated as a paint, it is defined as such because the mixture being higher in sulphur contents is of such viscosity at application, that permits it to be brushed or sprayed on the surface being coated.

A straight cement coating composition is broadly contemplated herein as a mixture of sulphur and binder and strength producer, and where it is designed to add coloring matter to the cement any of the metallic oxide pigments may be used for this purpose.

A specific example of the straight cement in accordance with this invention, is: 50% sulphur, 50% Portland cement.

The colored cement mixture is: 50% sulphur, 45% Portland cement, 5% metallic oxide pigment, such as Indian red or other color.

Sulphur is highly resistant to acid and by reason of its low melting point it is particularly adaptable to a coating compound of the present invention. The brittleness of the film deposited by the sulphur has been overcome.

In the so called cement composition, the Portland cement of any grade is incorporated into the mixture to provide a heavy filler and binder that gives a body to the cement and provides necessary weight to overcome the brittleness and lightness of the sulphur.

The Portland cement prevents the sulphur from breaking, cracking, peeling or otherwise detaching itself from the surface coated. It has been found that the addition of about five per cent mica to the composition with a corresponding reduction in the percentage of Portland cement adds resiliency to the cement after it has set so as to overcome cracking by impact or other shocks that the surface is subjected to in the course of its use.

The metallic oxide pigments for coloring purposes are necessary in the use of the cement because they are highly resistant and insoluble to attack from acids.

The composition used as a paint, has many applications and in its broadest aspect consists of a higher percentage of sulphur than is used in the so called cement composition, an inert filler or binder and a coloring agent which may be a metallic powder of aluminum or any of the metallic oxides.

A good working formula, and a specific example, which has been found to produce very good results in the formation of aluminum colored paint, consists of a mixture of sixty-five per cent sulphur, thirty per cent Portland cement, five per cent metallic aluminum.

When it is not desired to obtain the light color of aluminum the following specific example has been found to give results where other colors are desired, sixty-five per cent sulphur, thirty per cent Portland cement, five per cent of a metallic oxide pigment such as an Indian red or other metallic oxide coloring pigment.

It has been found by experiment, that a highly concentrated or straight aluminum paint can be made in accordance with this invention and broadly contemplates the use of sulphur and metallic aluminum powder without any inert filling material.

The paint is highly lustrous, as distinct from the steel color pigment in the above mentioned aluminum paint, but still the straight aluminum paint is not attacked nor deteriorated by acid, water or weather.

The specific example of the straight aluminum paint is, sixty-five per cent sulphur and thirty-five per cent powdered metallic aluminum.

A very simple and inexpensive manufacture of the above mentioned formula is carried out in accordance with this invention.

The sulphur, Portland cement, coloring materials are placed in a container capable of being heated. The heat is applied to the container and the mixture is agitated or mixed during the heating process, until all the elements are thoroughly incorporated with each other so as to provide a homogenous mixture throughout the mass.

The temperatures used to obtain a homogenous mixture fluctuate with the various percentages of mixtures from two hundred to four hundred degrees Fahrenheit but it has been found that an approximate temperature of two hundred fifty degrees Fahrenheit will give a very even result.

It is pointed out that the invention is by no means limited to this specific temperature of two hundred fifty degrees.

After the mass has been agitated to produce a homogenous mixture the mass may be poured into containers and is then ready to be sold in commerce.

It is to be understood that any of the following binders or inert filling materials may be substituted for Portland cement used in the specific example, namely:

Barium sulphate, barytes, fine plastic clay; bentonite; or any of the so called quick setting cements, marble dust, silica, silicious sand; porcelain, fire clay, mineral oxide, asbestos, graphite or aluminum.

It is furthermore pointed out that the invention is not limited to the specific example set forth in the foregoing description but contemplates changes, variations and modifications in the examples within the spirit of the claims appended.

In the application of the composition in accordance with this invention, the composition either in the cement or paint form is adapted for covering or coating all kinds of containers, tanks or other receptacles, parts, etc. formed of steel, wood, iron, concrete or other like material.

Moreover, all types of structural steel, or brick, building block, roofing and wall tile, composition roofing, pipe and any other surface or object that would require a water, weather or acid proof protective coating may be treated with the composition.

After the surface has been coated the protective layer forms a glossy, hard, resilient surface sealed from contacting elements and at the same time materially enhances the beauty of the surface.

The film or layer deposited, after congealing is capable of standing wear and tear of conditions to which it is subjected. Where parts of surfaces are to be worked after being coated, the same may be covered with fabric, wood or the like materials so as the coating will not adhere to the same, and to be more specific, a pipe to be coated by dipping operation may have the threads thereof covered so that the covering may protect the threads.

The composition to be applied to the surface, either the cement or paint, must be heated to approximately two hundred and fifty degrees Fahrenheit, whereupon the cement becomes liquid in the nature of molasses and the paints assume a viscosity of a free flowing liquid.

The surface to which the composition is to be applied is heated where the nature of the material permits and it can be heated by wheeled heaters, burners or hand blow torches, of the conventional type. The cement is then poured, mopped, brushed, or trowelled on, while the paint may be brushed or sprayed upon the surface to be coated.

The surface or object to be coated may be dipped in the composition and the latter method of application operates equally as well as the other methods mentioned.

It is to be understood that any of the hereinbefore mixtures can be sold in solid, granulated or powder form and may be heated on the particular job. Where the surface permits, the powder may be sifted or dusted on and anchored or incorporated thereto by rolling the same with a steam, gas or otherwise heated roller of desired weight. In event it be desired to coat the surface with an adhesive to hold the powder while being rolled it has been found that silicate of soda will serve the purpose without having any injurious effect upon the resulting coating.

Having thus described my invention, what I claim as new is:

1. A coating composition comprising a mixture of Portland cement, mica, sulphur, and a metallic coloring matter mixed together in the presence of heat.

2. A coating composition comprising a mixture of 40% Portland cement, 5% mica, 50% sulphur, and 5% of a metallic coloring matter mixed together at a temperature approximately 250 degrees Fahrenheit.

In testimony whereof I affix my signature.

FRANCIS D. SULLIVAN.